US012542193B2

United States Patent
Faccioli et al.

(10) Patent No.: US 12,542,193 B2
(45) Date of Patent: Feb. 3, 2026

(54) METHOD FOR IDENTIFYING INTERMEDIATES

(71) Applicants: ISTITUTO NAZIONALE DI FISICA NUCLEARE, Rome (IT); FONDAZIONE TELETHON, Rome (IT); UNIVERSITÀ DEGLI STUDI DI TRENTO, Trento (IT)

(72) Inventors: Pietro Faccioli, Verona (IT); Emiliano Biasini, Trento (IT)

(73) Assignees: Istituto Nazionale Di Fisica Nucleare, Rome (IT); Fondazione Telethon, Rome (IT); Università Degli Studid Di Trento, Trento (IT)

( * ) Notice: Subject to any disclaimer, the term of this patent is extended or adjusted under 35 U.S.C. 154(b) by 1078 days.

(21) Appl. No.: 17/263,201

(22) PCT Filed: Jul. 25, 2019

(86) PCT No.: PCT/IB2019/056371
§ 371 (c)(1),
(2) Date: Jan. 26, 2021

(87) PCT Pub. No.: WO2020/021493
PCT Pub. Date: Jan. 30, 2020

(65) Prior Publication Data
US 2021/0313007 A1    Oct. 7, 2021

(30) Foreign Application Priority Data
Jul. 26, 2018    (IT) .................... 102018000007535

(51) Int. Cl.
*G16B 15/20*    (2019.01)
*G16B 5/30*    (2019.01)
*G16B 15/30*    (2019.01)

(52) U.S. Cl.
CPC ............... *G16B 15/20* (2019.02); *G16B 5/30* (2019.02); *G16B 15/30* (2019.02)

(58) Field of Classification Search
None
See application file for complete search history.

(56) References Cited

U.S. PATENT DOCUMENTS

| 2008/0183452 A1 | 7/2008 | Parida et al. |
| 2008/0270094 A1 | 10/2008 | Agarwal |
| 2013/0130294 A1 | 5/2013 | Han |

FOREIGN PATENT DOCUMENTS

| CN | 101436230 A | 5/2009 |

OTHER PUBLICATIONS

Shukla, Diwakar, et al. "Activation pathway of Src kinase reveals intermediate states as targets for drug design." Nature communications 5.1 (2014): 3397. (Year: 2014).*

(Continued)

*Primary Examiner* — Karlheinz R. Skowronek
*Assistant Examiner* — Mary C Leverett
(74) *Attorney, Agent, or Firm* — ArentFox Schiff LLP

(57) ABSTRACT

A method for identifying target protein folding intermediates, suitable to be tested as targets for drug discovery procedures. The method is carried out by means of electronic computing. The method provides a step of modelling a sequence in time of events defining a folding pathway of a protein, which includes modelling and/or calculating structural and/or energy and/or physical-chemical properties of one or more protein folding intermediate states along the folding pathway. Then, the method includes identifying at least one candidate protein folding intermediate, along the modelled folding pathway, based on identification properties, and selecting one or more target protein folding intermediates, among the at least one candidate protein folding intermediate, based on selection properties. The selection (Continued)

properties are related to the druggability of the protein folding intermediate. A related method for in silico drug discovery based on folding intermediate targeting is also provided.

15 Claims, 3 Drawing Sheets

(56) References Cited

OTHER PUBLICATIONS

Perola, Emanuele, Lee Herman, and Jonathan Weiss. "Development of a rule-based method for the assessment of protein druggability." Journal of chemical information and modeling 52.4 (2012): 1027-1038. (Year: 2012).*

Ghattas, Mohammad A., et al. "Druggability analysis and classification of protein tyrosine phosphatase active sites." Drug design, development and therapy (2016): 3197-3209. (Year: 2016).*

Tiana, Guido, and Carlo Camilloni. "Ratcheted molecular-dynamics simulations identify efficiently the transition state of protein folding." The Journal of chemical physics 137.23 (2012). (Year: 2012).*

Lionta, Evanthia, et al. "Structure-based virtual screening for drug discovery: principles, applications and recent advances." Current topics in medicinal chemistry 14.16 (2014): 1923-1938. (Year: 2014).*

Morra, Giulia, Massimiliano Meli, and Giorgio Colombo. "Molecular dynamics simulations of proteins and peptides: from folding to drug design." Current Protein and Peptide Science 9.2 (2008): 181-196. (Year: 2008).*

Englander, S. Walter, and Leland Mayne. "The nature of protein folding pathways." Proceedings of the National Academy of Sciences 111.45 (2014): 15873-15880. (Year: 2014).*

Search Report for PCT/IB2019/056371 dated Oct. 4, 2019.

Anathe O. M.Patschull et al:"In Silico Assessment of Potential Druggable Pockets on the Surface of [alpha]1-Antitrypsin Conformers", PLOS ONE, vol. 7,No. 5, May 8, 2012.

Zheng Xiliang et al: "Pocket-Based Drug Design: Exploring Pocket Space", The AAPS Journal, Springer US, Boston, vol. 15, No. 1, Nov. 22, 2012 (Nov. 22, 2012), pp. 228-241.

* cited by examiner

METHOD FOR IDENTIFYING INTERMEDIATES

CROSS-REFERENCE TO RELATED APPLICATIONS

This application is a National Phase Application of PCT International Application No. PCT/IB2019/056371, having an International Filing Date of Jul. 25, 2019 which claims priority to Italian Application No. 102018000007535 filed Jul. 26, 2018, the entire contents of each of which are hereby incorporated by reference in their entirety.

TECHNOLOGICAL BACKGROUND OF THE INVENTION

A method for identifying target protein folding intermediates, suitable to be tested as targets for drug discovery procedures, is here described. The method is carried out by means of electronic computing.

DESCRIPTION OF THE BACKGROUND ART

The questions of how proteins fold, why they fold in that way, and how the folding pathway of each protein is encoded in its sequence and structure have fundamental significance for protein structure and design, folding and misfolding, regulation and function, clinical problems, and industrial applications.

B. Nolting 1999 (Protein Folding Kinetics: Biophysical Methods, Springer, Berlin); W. A. Eaton et al. 2000 (Annu. Rev. Biophys. Biomol. Struct. 29, 327); V. Daggett and A. Fersht 2003 (Nat. Rev. Mol. Cell Biol. 4, 497) describe attempts to understand the kinetics of protein folding. The need to identify novel therapeutic targets to be addressed is a long felt need.

Here, it has been firstly demonstrated how a novel computational approach, capable to identify relevant pathways of the protein folding process, revealed itself useful in the identification of druggable target protein folding intermediates, paving new avenues for drug discovery on pharmacological targets not addressed before.

SUMMARY OF THE INVENTION

The object of the invention is defined by the appended claims.

More specifically, the invention refers to a method for identifying target protein folding intermediates suitable to be tested as targets for drug discovery procedures, and to a method for in silico drug discovery based on folding intermediate targeting.

In particular, the invention allows to identify folding intermediates that, once bound to selected ligands, are stabilized, which can lead, for example, to the result that the stabilized folding intermediates are removed from a cell, thus inhibiting their activity.

In another embodiment, the invention allows the identification of intermediates that, once bound to selected ligands, may be stabilized and, possibly, activated.

DETAILED DESCRIPTION OF THE INVENTION

Figure 1:
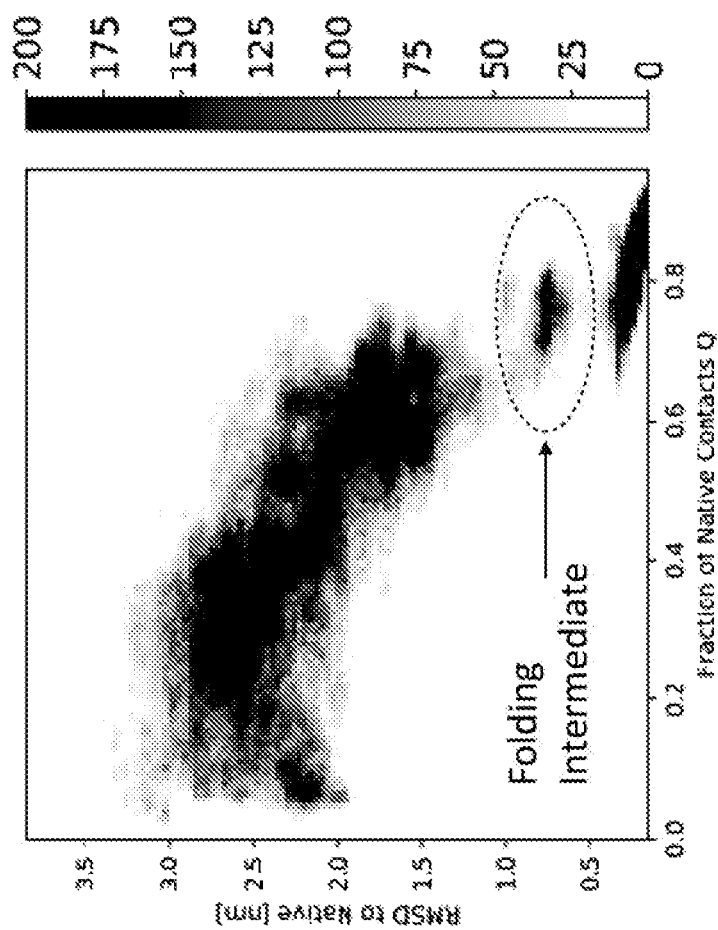
FIG. 1: Frequency histogram of the conformations in the folding pathway of human PrPC, calculated with the Bias Functional (BF) approach. Trajectories have been projected on two collective variables described in the text: the fraction of native contacts Q and the root-mean-square deviation (RMSD) from the native structure (PDB code: 1QLZ).
Figure 2:
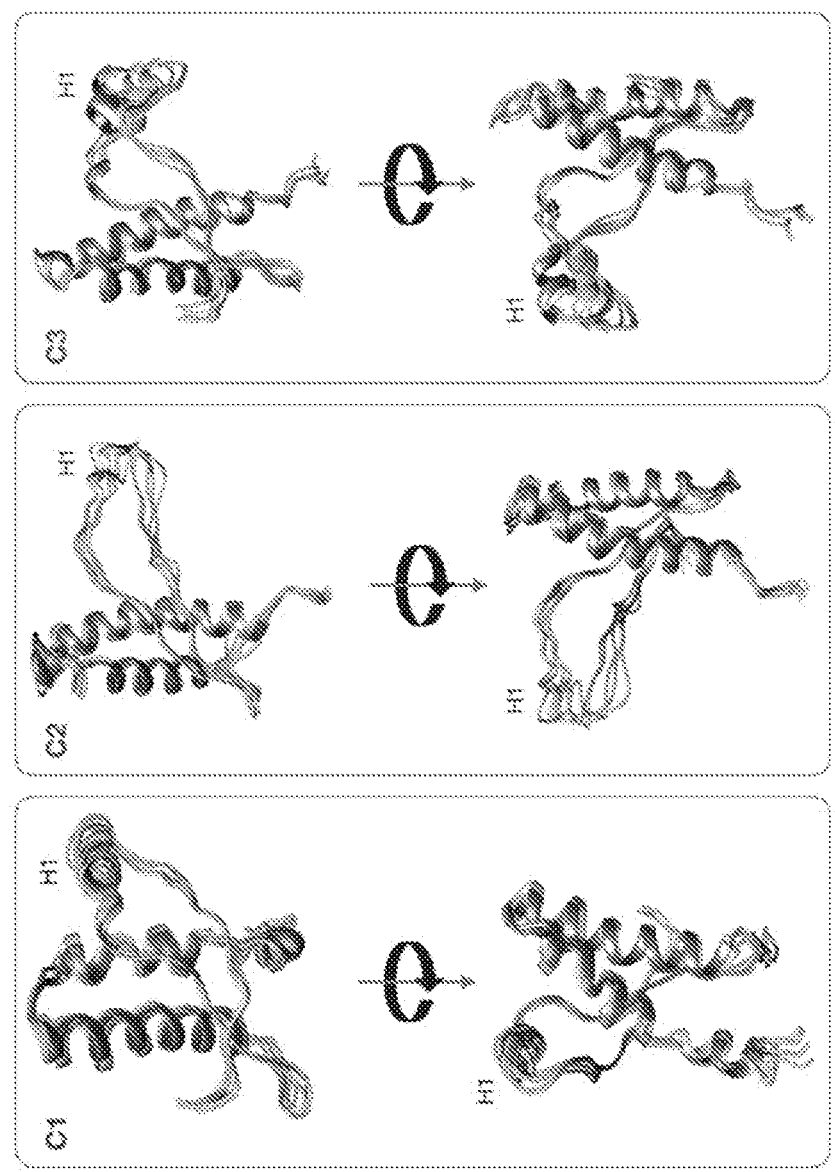
FIG. 2: Three main clusters (referred to as cluster C1, C2 and C3) representing the most visited structures in the folding intermediates of PrPC
Figure 3:
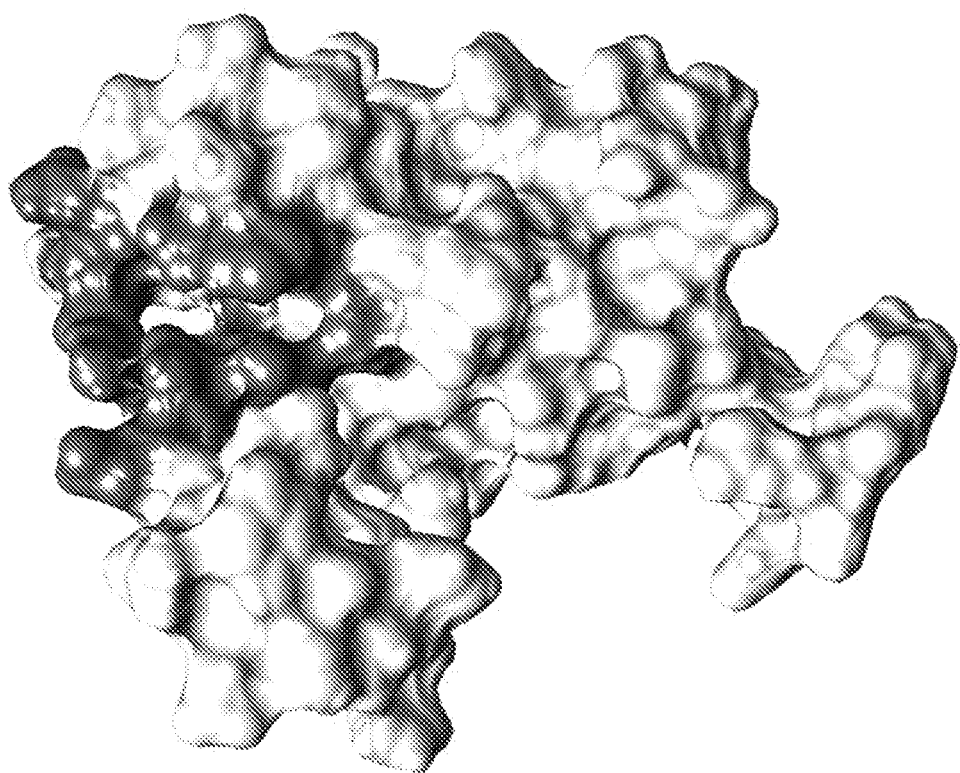
FIG. 3: Potentially druggable regions in the Folding Intermediate of Prion Protein PrP (FI-PrP).

A method for identifying target protein folding intermediates, suitable to be tested as targets for drug discovery procedures, is here described.

The method comprises the steps illustrated here below, which are carried out by means of electronic computing.

The method provides a step of modelling a sequence in time of events defining the folding pathway of a protein, which comprises modelling and/or calculating structural and/or energy and/or physical-chemical properties of one or more protein folding intermediate states along said folding pathway. This step of modelling may comprise, for example, modelling a sequence of protein folding intermediate states along the folding pathway.

Then, the method comprises the step of identifying at least one candidate protein folding intermediate, along the modelled folding pathway, based on identification properties (comprised among said structural and energy and/or physical-chemical properties); and the step of selecting one or more target protein folding intermediates, among said at least one candidate protein folding intermediate, based on selection properties (comprised among said structural and energy and/or physical-chemical properties).

The selection properties are related to the druggability of the protein folding intermediate.

According to the present description, the "folding pathway" describes the transition from an unfolded protein to its native fold over the course of time, i.e., how a chain of amino acids reaches its thermodynamically stable state.

In an embodiment of the invention, the application context of the "protein folding" and "folding pathways", mentioned in the present description, is intended within the endogenous protein synthesis, and not related to as denaturing or renaturing processes or to conformers or "short lived conformations".

According to the present description, the "druggability" is the ability of a protein, or any "conformer" of a protein, to allow binding of a drug (e.g., a small molecule, any other organic compound, a peptide or an antibody), thus causing potential therapeutic benefits for patients. A "conformer" is each alternative conformation of the same polypeptide. It reflects the conformational isomerism of polypeptides and the statistical character of the thermodynamic states of macromolecules.

As noted above, the method provides two distinct steps of "identifying candidate protein folding intermediates" (based on a first set of properties of folding intermediate states, in this description called "identification properties"), and "selecting target protein folding intermediates" (based on a second set of properties of folding intermediate states, in this description called "identification properties").

In the following part of the description, several examples of "identification properties" and "selection properties" will be illustrated. It will be apparent that the "identification properties" and the "selection properties" may be different, and are actually different in the preferred embodiments of the invention.

According to an embodiment of the method, said identification properties comprise energy and/or physical-chemical properties of the protein folding intermediate. According to an implementation option of this embodiment, the identification properties comprise a free energy barrier between an intermediate state and the native state of the protein, or between an intermediate state and the next intermediate towards the native state. In this case, the step of identifying comprises identifying as "candidate protein folding intermediate" an intermediate characterized in that the free energy barrier between said intermediate and the native state or the next intermediate towards the native state is larger than a free energy threshold.

In an implementation example, the free energy threshold is 7.5 KJ/mol.

According to another implementation option of this embodiment, the identification properties comprise the life-time of the intermediate, defined as the inverse rate of transitions from the intermediate to the native state, or to the next intermediate along the folding pathway.

In this case, the method comprises the further step of estimating said life-time of the intermediate, and the step of identifying comprises identifying as "candidate protein folding intermediate" an intermediate having a life-time longer than a minimum life-time threshold.

In an implementation example, the minimum life-time threshold may be at least three times the protein half-life in physiological conditions.

According to an embodiment of the method, the step of identifying at least one candidate protein folding intermediate comprises identifying metastable states.

Considering now the second set of properties, i.e., the "selection properties", the following details are provided.

According to an embodiment of the method, the selection properties comprise structural properties related to the druggability of the candidate protein folding intermediate considered.

According to another embodiment of the method, the selection properties comprise scoring parameters for protein hot-spot identification.

In the present description, consistently with a terminology commonly used in pharmaceutical research, a "hot-spot" is a site on a target protein that has high propensity for ligand binding and hence is potentially important for drug discovery.

According to an embodiment of the method, the step of selecting further comprises selecting as target protein folding intermediate an intermediate having selection properties not present in the native state.

According to an implementation option, the step of selecting further comprises selecting as target protein folding intermediate an intermediate having a druggable pocket not present in the native state.

In the present description, consistently with a terminology commonly used in the field of pharmaceutical research, the term "pocket" indicates a spatial region of the protein tertiary structure suitable for binding a small molecule.

In particular, the concept of druggable pockets refers to a specific binding site of a disease-linked protein target capable to bind drug-like molecules thus obtaining a modulation of the protein biological function.

When the binding site is not known from a 3D structure (e.g., ligand-protein complex) or from other experimental data (e.g., drug resistance mutations), computational methods can be employed to suggest likely locations.

The following parts of this description mention several properties and/or parameters and/or global pocket descriptors (and respective exemplary values) that are used in the described method to characterize binding sites/pockets.

According to another implementation option, the step of selecting further comprises selecting as target protein folding intermediate an intermediate having a druggable pocket characterized by a root-mean-square-deviation (RMSD) larger than a root-mean-square-deviation threshold from the pocket present in the native state.

In implementation examples, said root-mean-square-deviation threshold is equal to 2 Ångström (Å) or greater than 2 Ångström (Å).

According to an embodiment of the method, the selection properties comprise the presence of a druggable pocket in the considered candidate protein folding intermediate, wherein the druggable pocket is defined in terms of pocket parameters.

According to an embodiment of the method, the step of selecting comprises the steps of binding pocket identification, binding pocket characterization, binding pocket druggability prediction.

In this case, the step of selecting comprises selecting one or more target protein folding intermediates among the candidate protein folding intermediates identified, based on the comparison of said pocket parameters with respective thresholds.

According to different implementation options of this embodiment, the above mentioned pocket parameters comprise dimensional parameters, and/or form parameters, and/or position parameters, and/or ratio of hydrophobic to hydrophilic character.

In particular, dimensional pocket parameters may comprise volume of the pocket and/or depth of the pocket and/or the enclosure and exposure of the pocket. The exposure and enclosure properties provide a different measure of how open is the site to solvent.

In an implementation example, the pocket volume threshold is at least 350 Å$^3$.

In an implementation example, the pocket exposure threshold is less than 0.49 and the pocket enclosure threshold is at least 0.78.

In an implementation example, the pocket depth threshold is at least 13 Å.

Among the selection properties, scoring parameters for protein hot-spot identification have been previously mentioned.

With regard to this feature, different embodiments of the method provides that such scoring parameters comprise "SiteScore", and/or "Dscore", and/or "DrugScore" and or pocket balance.

These parameters are per se known, in the field of modelling and characterization of protein and protein intermediates, and are based on a mix of values, related to different properties, suitable to evaluate the "druggability" of a protein native state or a protein folding intermediate.

In fact, such scoring parameters derive from known evaluation software packages.

For example, SiteMap (Halgren T A (2009) "Identifying and characterizing binding sites and assessing druggability", J. Chem. Inf. Model 49:377-389) predicts a site score (SiteScore) and druggabilty score (DScore) through a linear combination of only three single descriptors: the size of the binding pocket, its enclosure, and a penalty for its hydrophilicity.

Another example is DoGSiteScorer (A. Volkamer, D. Kuhn, T. Grombacher, F. Rippmann, M. Rarey, "Combining global and local measures for structure-based druggability predictions" J. Chem. Inf. Model. 2012, 52, 360-37), which also generates a druggability score (DrugScore) which range from zero to one.

Obviously, in other embodiments of the present method, other known scoring parameters may be used, and/or new scoring parameters may be defined and adopted.

The selection, also in this case, is based on the comparison of the scoring parameters with respective thresholds.

In some embodiments of the present method, the scoring parameters threshold are selected as follows.

In an implementation example, the pocket SiteScore threshold is 0,8.

In an implementation example, the pocket DScore threshold is 0,98.

In an implementation example, the pocket DrugScore threshold is 0,5.

In an implementation example, the pocket balance threshold is 1,0.

As illustrated above, the present method provides properties to be used as a basis for the identification of candidate protein folding intermediates and selection of target protein folding intermediates.

Moreover, the present method also provides criteria for the above mentioned identification and selection steps. These criteria are based, for example, on a comparison of parameters and/or values related to the properties chosen for the identification and/or selection with respective thresholds.

Exemplary values for the thresholds have been provided in the above description. Nonetheless, the person skilled in the art can understand that the method is not limited by the mentioned exemplary values, because the threshold may be chosen case by case, according to the type of protein or to other requirements.

According to an embodiment of the method, the step of modelling a sequence in time of a protein folding pathway is carried out by means of computer simulations based on the Molecular Mechanics (MM) or Quantum-Mechanics Molecular Mechanics (QM-MM) approaches.

According to different possible implementation options of this embodiment, the above mentioned computer simulations are carried out by means of computer simulations based on Ratchet-and-pawl molecular dynamics, and/or a Bias Functional computation approach, and/or by means of a Self Consistent Path Sampling computation approach.

The skilled person in the art can easily understand that the above mentioned algorithms and computational approaches are only examples, provided for the sake of the clarity of the disclosure, and that the method can be carried out by using other algorithms and computational approaches, not explicitly mentioned here, providing the same type of results.

More details on exemplary algorithms that can be effectively used to carry out the above mentioned step of modelling time evolution of a protein folding pathway can be found in the scientific papers "S. Orioli, S. a Beccara, and P. Faccioli, J. Chem. Phys. 147, 064108 (2017)"; "C. Camilloni, R. A. Broglia, and G. Tiana, J. Chem. Phys. 134, 045105 (2011)"; "S. a Beccara, L. Fant, and P. Faccioli, Phys. Rev. Lett. 114, 098103 (2015)".

According to other possible embodiments of the method, the step of modelling a sequence in time of a protein folding pathway is carried out by means of computer simulations based on any other in silico approach yielding the reconstruction of protein folding pathways or the identification of folding intermediates.

According to other possible embodiments of the method, the step of modelling a sequence in time of a protein folding pathway is carried out by any experimental approach yielding the reconstruction of protein folding pathways or the identification of folding intermediates.

A method for in silico drug discovery based on folding intermediate targeting, comprised in the invention, is described here below.

Such a method comprises the steps of carrying out a method for identifying target protein folding intermediates suitable to be tested as targets for in silico drug discovery procedures, according to any one of the embodiments described above.

Based on this, the method for in silico drug discovery provides carrying out in silico drug discovery on the selected target protein folding intermediates.

According to an embodiment of this method, the step of carrying out in silico drug discovery on each selected target protein folding intermediate, in which a druggable pocket or a hot-spot has been identified, comprises: identifying potential ligands based on the properties of the one or more druggable pocket and/or hot spot identified in the target protein folding intermediate, wherein said one or more druggable pocket and/or hot spot are considered possible binding sites; then, modelling the interaction of each of the identified ligands with each of the identified binding sites through in silico simulations; finally, selecting ligands based on the above mentioned modelling.

In different implementation options of the method, in principle any known procedure for in silico drug discovery may be employed.

The present disclosure also encompasses a computer program, comprising at least one program instruction, which, when executed by a computer, causes the computer to execute the method for identifying target protein folding intermediates as described in any of the above illustrated embodiments.

The present disclosure further encompasses a computer program, comprising at least one program instruction, which, when executed by a computer, causes the computer to execute the method for in silico drug discovery as described in any of the above illustrated embodiments.

Obviously, the term "computer" is to be intended, in the context of this description, in its broadest sense, including super-computers and/or computer clusters, or any other type of known electronic processor.

The present disclosure also comprises a carrier and/or media and/or support carrying the above mentioned computer program or programs.

In the following part of the description, further details are provided about exemplary, non-limiting embodiments of the invention.

The phases indicated below outline the actual actions carried out by the skilled person while executing the method.
(i) Target Identification.

The target identification and selection tasks have been extensively described above.
(ii) Druggable Pocket Identification.

In silico scouting analyses of selected candidate protein folding intermediate lead to the selection of target protein folding intermediates having solvent-exposed, druggable pockets which are unique in the selected protein folding intermediates, and not present in the native form of the protein.
(iii a) Small Molecule Identification.

In an embodiment according to the present invention, the step of selecting comprises selecting the highest ranked pocket(s), i.e., the highest ranked target protein folding intermediate(s), which is/are then employed to carry out virtual drug screening campaigns to identify potential small ligands. Depending on the research area/target, ad-hoc virtual chemical libraries are designed and built. Computational approaches/tools available in the state of the art, such as docking-based virtual screening, assessment of ligand affinity, ligand efficiency (LE) and ligand lipophilicity efficiency (LLE), removal of Pan-Assay Interference Compounds and potential aggregators, evaluation of physicochemical and ADMET compound properties, similarity and clustering analysis of virtual compounds are applied to select the most promising candidates.

The here described and claimed approach allows to select in an efficient manner the most promising candidates to be then tested in more expensive and time consuming in vitro experiments.

(iii b) Other Molecule Identification.

In other embodiments according to the present invention, compounds identified according to the described method may include antibodies (and antibodies derivatives), toxins, nucleic acids; such molecules may also be represented by endogenous metabolites.

(iv) Cell-Based Assay

As an example, ligands predicted by virtual screening are validated in stably transfected heterologous cell systems by testing their ability to post-translationally reduce the expression of the target protein in a dose-dependent fashion.

In principle, any compound binding to a folding intermediate of a protein with a high enough affinity could lower its energy state, stabilizing its structure and thus extending its half-life. In a cellular context such stabilization effect may produce an unusually long-lived folding intermediate that is recognized by the folding quality control machinery of the cell, impeding the correct addition of post-translational modifications, and/or leading to its degradation (e.g. via proteasome-associated degradation and/or autophagy). Following this principle, the in silico predicted candidate ligands of the identified folding intermediate are tested in standard heterologous cell systems (e.g. HEK293, CHO, SH-SY5Y or Hela cells), to select compounds capable of reducing or completely suppressing the overall expression of the target protein (e.g., the protein for which a suitable target folding intermediate has been identified) in a dose-dependent fashion, as assayed by standard biochemical techniques (e.g. western blotting). In case the target protein is not endogenously expressed in the available cell systems, expression vectors are designed and cells are stably transfected in order to obtain the expression of the target protein.

EXAMPLE

Prion diseases are associated with the conformational conversion of PrPC, an endogenous glycosyl-phosphatidyl-inositol (GPI)-anchored cell-surface glycoprotein, into a misfolded isoform called "scrapie form of PrP" (or PrPSc) that accumulates in the central nervous system of affected individuals. PrPSc is an infectious protein (prion) lacking any detectable information-coding nucleic acid, that replicates by directly binding to PrPC and triggering its conformational rearrangement into new PrPSc molecules. A great deal of evidence indicates that the necessary information specifying the biological properties of prions is encoded exclusively into the structure of PrPSc, and that distinct PrPSc conformers could generate different strain properties, including the neuropathological and clinical features underlying the various forms of prion diseases. Disease-associated mutations in the PrP gene are thought to favor the misfolding of PrPC into aggregated and pathogenic PrPSc-like forms. Despite these peculiar features, increasing evidence arising from genetic, biophysical and biochemical studies indicate that the pathogenic mechanisms operating in prion diseases may lie at the root of the neurodegenerative pathways occurring in several other disorders. A large and increasing set of evidences prompt to the conclusion that compounds capable of modulating the expression and/or activity of PrPC could provide a completely new therapeutic perspective for several neurodegenerative disorders.

The method here described herein has been applied to identify small molecules targeting a folding intermediate of PrPC, thus potentially capable of post-translationally inhibiting the expression of PrPC.

PrP folding pathways have been calculated using the BF procedure in explicit solvent, using the Amber ff99SB-ILDN force field with TIP3P solvent model using Gromacs 4.6.5, where the BF approach is integrated in the Plumed 2.0.2 plug-in. 12 independent unfolded conformations obtained by thermal unfolding MD simulations, initiated from the energy-minimized PrP native structure have been considered. For each of the 12 initial unfolded conditions, all the 20 rMD trial trajectories generated by rMD were scored by evaluating their BF functional. Three sets of trajectories were discarded because none of the folding pathways converged to the native state. Using this scheme, 9 independent folding trajectories have been collected, by selecting the Least Biased Trajectories (LBTs) according to the BF procedure, as detailed in S. a Beccara, L. Fant, and P. Faccioli, Phys. Rev. Lett. 114, 098103 (2015).

To look for candidate folding intermediates the folding trajectories computed using the algorithm called ratchet-and-pawl molecular dynamics (as detailed in S. a Beccara, L. Fant, and P. Faccioli, Phys. Rev. Lett. 114, 098103 (2015)) were used to compute a two-dimensional frequency histogram of the fraction of native contacts collective variable Q and the RMSD from the native structure. The variable Q of a protein configuration was obtained by dividing the number of atom pairs in the said configuration with a relative distance smaller than 7.5 Ångström by the number of atom pairs with a relative distance smaller than 7.5 Ångström in the native configuration.

The existence of an on-pathway folding intermediate at 0.5 nm<RMSD<0.9 nm and a 0.65<Q<0.85 has been observed (see FIG. 1, encircled). In order to extract the conformations describing the folding pathway obtained, a two-step filtering of the LBTs was applied:

(i) For each set of conformations explored by the LBTs, only the ones residing on high populated regions of the plot in FIG. 1 have been retained. To perform this task, the negative logarithm of the probability of observing a given conformation (defined in terms of Q and RMSD) has been calculated and all the points having a stability deviation respect to the global minimum higher than 3.5 kBT (long living state regions) have been excluded.

(ii) In order to focus only on the region of interest, the conformations have been further filtered by retaining only the ones displaying: 0.5 nm<RMSD<0.9 nm and 0.65<Q<0.85.

Clustering of the intermediate conformations was performed using k-means [RStudio: Integrated Development for R. RStudio, Inc., Boston, MA]. The number of clusters was chosen using the "Elbow Method". The contact map distance was used as clustering metrics. The clustering procedure yielded 3 differently populated groups, hereby referred to as cluster C1, C2 and C3 (see FIG. 2). Conformations sampled from the most populated of such clusters (C2 and C3) show a displaced helix-1, offering a potential binding site. In order to identify a single representative conformation in each of the three clusters (C1, C2 and C2), first, we calculated the average contact map within the group and then we identified the structure in that group such that the distance between its contact map and the average contact map in the cluster was least.

In silico modeling and virtual drug screening have been employed in order to identify potential ligands for FI-PrP, focusing on a unique binding site which was present in the representative element of C3 and absent in the native form of PrPC (FIG. 3). In silico drug screening on this site was performed according to the following procedure:

1) Starting from the representative conformation of cluster C3, we performed 50 ns of molecular dynamics (MD) in the explicit solvent model at 300 K. In such a simulation, the relative position of the backbone atoms were kept fixed, in order to sample exclusively the arrangement of the side chains.

2) The conformations visited by such an MD trajectory were structurally clustered in two groups, as the MD trajectory suggested the presence of two main pockets. We randomly extracted 10 conformations from each group.

3) We analyzed the resulting 20 conformations using Sitemap, in order to identify the one containing the sites with the highest druggability.

4) The conformation identified in the previous step was used as target for drug screening, using the Asinex commercial library, which includes about 250,000 small molecules.

5) The result of such virtual screening were filtered according to predicted pharmacodynamics and pharmacokinetics, leading to a final pool consisting of 275 virtual hits. For illustrative purposes, we report here the chemical structure of the drug candidate in this group which is predicted to have the highest binding affinity:

Formula 1

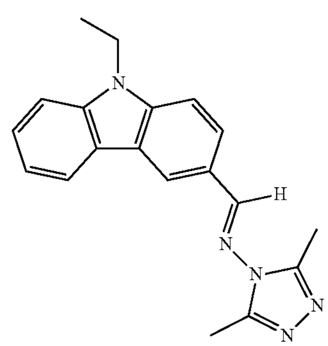

In principle, a compound binding to a folding intermediate of a protein with enough affinity could lower its energy state, stabilizing its structure and thus extending its half-life. In a cellular context, for proteins synthesized directly in the lumen of the endoplasmic reticulum (ER), like PrPC, such stabilization effect may produce an unusually long-lived folding intermediate that could be recognized by the ER quality control (ERQC) machinery, impeding the correct addition of post-translational modifications, and likely leading to degradation (e.g. ER-associated degradation and/or autophagy). Following this principle, the putative ligands of FI-PrP identified by means of the proposed screening protocol can be tested for their ability to induce the degradation and/or alter the post-translational processing of wild-type (WT) PrPC expressed in stably transfected HEK293 cells. First, cells should be incubated with increasing concentrations (indicatively 0.01-50 μM) of each molecule. Then, the resulting level of PrPC expression should be analyzed by western blotting. Small molecules with high affinity are expected to induce a dose-dependent decrease of PrP cellular expression.

As noted above, the described method, by virtue of its features, as above illustrated, allows to achieve the scope of the invention.

In particular, the method allows, in a unique way, to identify binding pockets in folding intermediates (not identifiable by known solution), which leads to evident advantages related to the identification of potential targets for drugs.

The invention claimed is:

1. A computer-implemented method for identifying target protein folding intermediates suitable to be tested as targets for drug discovery procedures, the method comprising the following steps:

modelling a sequence in time of events defining a folding pathway of a protein, comprising modelling and/or calculating structural, energy, and/or physiochemical properties of a plurality of protein folding intermediate states along said folding pathway;

identifying at least one candidate protein folding intermediate, along the modelled folding pathway, based on said structural, energy, and/or physiochemical properties; and selecting a target protein folding intermediate, from said at least one candidate protein folding intermediate, based on the target protein folding intermediate having a druggable pocket not present in the native state of the target protein folding intermediate, or a druggable pocket characterized by a root-mean-square-deviation ("RMSD") larger than a RMSD threshold from the pocket present in the native state of the target protein folding intermediate;

wherein the folding pathway of the protein describes the transition from an unfolded protein to its native fold over the course of time; and wherein the target protein folding intermediate is selected based on selection criteria comprising:

a pocket volume threshold is at least 350 $Å^3$;

a pocket depth threshold is at least 13 Å;

a pocket DrugScore threshold is ≥0.5;

a pocket SiteScore threshold is ≥0.8;

a pocket DScore threshold is ≥0.98;

a pocket exposure ≤0.49; and a pocket exposure ≥0.78.

2. The method of claim 1, wherein said at least one candidate protein folding intermediate is identified based on energy and physiochemical properties of the protein folding intermediate.

3. The method of claim 1, wherein said selection criteria comprise:

structural properties related to the druggability of the candidate protein folding intermediate, and/or scoring parameters for protein hot-spot identification.

4. The method of claim 3, wherein said selection criteria comprise scoring parameters for protein hot-spot identification, and said scoring parameters comprise a SiteScore, a Dscore, and/or a DrugScore.

5. The method of claim 1, wherein:

said at least one candidate protein folding intermediate is identified based on a free energy barrier between an intermediate state and the native state of the protein resulting from the at least one candidate protein folding intermediate, or between an intermediate state and the next intermediate towards the native state of the at least one candidate protein folding intermediate, and said at least one candidate protein folding intermediate is an intermediate characterized in that the free energy barrier between said intermediate and the native state of the protein resulting from the at least one candidate protein folding intermediate or the next intermediate towards the native state of the protein resulting from the at least one candidate protein folding intermediate, is larger than a free energy threshold.

6. The method of claim 1, further comprising:

estimating a lifetime of the at least one candidate protein folding intermediate, defined as the inverse rate of transitions from the at least one candidate protein folding intermediate to the native state of the protein resulting from the at least one candidate protein folding intermediate, or to a next intermediate along the folding pathway;

wherein said step of identifying comprises identifying as the at least one candidate protein folding intermediate an intermediate having a lifetime longer than a minimum lifetime threshold.

7. The method of claim 1, wherein said step of identifying at least one candidate protein folding intermediate comprises identifying metastable states.

8. The method of claim 1, wherein:

said selection criteria comprise the presence of a druggable pocket in the at least one candidate protein folding intermediate, wherein the druggable pocket is defined in terms of one or more pocket parameters, and said step of selecting comprises selecting one or more target protein folding intermediates from the at least one candidate protein folding intermediates based on the comparison of said pocket parameters with one or more respective thresholds.

9. The method of claim 8, wherein said one or more pocket parameters comprise dimensional parameters, form parameters, and/or position parameters, and/or a ratio of hydrophobic to hydrophilic amino acids defining said pocket.

10. The method of claim 9, wherein said pocket dimensional parameters comprise volume of the pocket, depth of the pocket, and/or enclosure and/or exposure of the pocket.

11. The method of claim 1, wherein the step of modelling the sequence in time of events defining the folding pathway of the protein is carried out by means of computer simulations based on the Molecular Mechanics (MM) or Quantum-Mechanics Molecular Mechanics (QM-MM) approaches.

12. The method of claim 11, wherein said step of modelling the sequence in of events defining the folding pathway of the protein is carried out by means of computer simulations based on Ratchet-and-pawl molecular dynamics, a Bias Functional computation approach, and/or by means of a Self-Consistent Path Sampling computation approach.

13. A method for in silico drug discovery based on folding intermediate targeting, comprising:

performing the computer-implemented method for identifying target protein folding intermediates, of claim 1; and carrying out in silico drug discovery on the selected one or more target protein folding intermediates.

14. The method of claim 13, wherein the step of carrying out in silico drug discovery on the selected one or more target protein folding intermediates comprises:

identifying potential ligands based on one or more properties of one or more druggable pockets and/or protein hot-spots identified in each of the selected one or more target protein folding intermediates, said one or more druggable pockets and/or protein hot-spots being identified as possible binding sites for one or more of the potential ligands;

modelling the interaction of each of the identified binding sites with the one or more potential ligands through in silico simulations; and selecting one or more of the one or more potential ligands as a drug candidate based on said modelling.

15. A non-transitory computer-readable storage medium, the computer-readable storage medium including instructions that when executed by a computer, cause the computer to:

model a sequence in time of events defining a folding pathway of a protein, comprising modelling and/or calculating structural and/or energy and/or physiochemical properties of a plurality of protein folding intermediate states along said folding pathway;

identify a set of one or more candidate protein folding intermediates, along the modelled folding pathway, based on the modeled and/or calculated structural, energy and/or physiochemical properties; and select one or more target protein folding intermediates, from the set of one or more candidate protein folding intermediates, based on selection criteria for said structural and/or energy and/or physiochemical properties, said selection criteria being related to druggability of the one or more target protein folding intermediates;

wherein the folding pathway of the protein describes the transition from an unfolded protein to its native fold over the course of time;

wherein the one or more target protein folding intermediates is selected based on selection criteria comprising:

a pocket volume threshold is at least 350 $Å^3$;

a pocket depth threshold is at least 13 Å;

a pocket DrugScore threshold is $\geq 0.5$;

a pocket SiteScore threshold is $\geq 0.8$;

a pocket DScore threshold is $\geq 0.98$;

a pocket exposure $\leq 0.49$; and a pocket exposure $\geq 0.78$.

* * * * *